United States Patent [19]

Feinbloom

[11] Patent Number: 5,452,030
[45] Date of Patent: Sep. 19, 1995

[54] ADJUSTABLE PRISM ALIGNMENT APPARATUS

[75] Inventor: Richard E. Feinbloom, New York, N.Y.

[73] Assignee: Designs for Vision, Inc., Ronkonkoma, N.Y.

[21] Appl. No.: 59,242

[22] Filed: May 7, 1993

[51] Int. Cl.6 .......................... G02C 7/14; G02B 25/00
[52] U.S. Cl. ...................................... 351/175; 359/481
[58] Field of Search ................. 351/159, 175; 359/480, 359/482

[56] References Cited

U.S. PATENT DOCUMENTS

| | | | |
|---|---|---|---|
| 1,769,295 | 7/1930 | Kenneback | 351/175 |
| 4,522,474 | 6/1985 | Slavin | 351/203 |
| 4,779,965 | 10/1988 | Beecher | 359/480 |
| 5,002,383 | 3/1991 | Sisler | 351/175 |
| 5,104,214 | 4/1992 | Sims | 351/235 |
| 5,204,702 | 4/1993 | Shapiro | 351/175 |
| 5,302,981 | 4/1994 | Wirtz | 351/246 |

Primary Examiner—Scott J. Sugarman
Attorney, Agent, or Firm—Plevy & Associates

[57] ABSTRACT

An apparatus for enabling a user having a visual handicap indicative of a condition designated as double vision to obtain substantially binocular vision comprises a first prism associated with the left eye of the user and having a base and a first prismatic deviation, a second prism having a base and a second prismatic deviation different from the first prismatic deviation, and a rotating assembly for rotating the prisms until a binocular vision field is viewable through the prisms by the user. The prismatic deviations are selected so that rotation of the prisms aligns them in a manner which permits the brain to fuse the respective images viewed by each eye into a single image, thereby providing a binocular image field. If desired, corrective lenses which accommodate the far or near distance prescriptions of the left and right eyes may mounted in alignment with the corresponding prisms.

20 Claims, 5 Drawing Sheets

ADJUSTABLE PRISM ALIGNMENT APPARATUS

BACKGROUND OF THE INVENTION

This invention relates to visual aids for the visually handicapped and, more particularly, to a prismatic lens system which provides users suffering from diplopia with a binocular vision field.

All of the motions of the eye are accomplished by six muscles, called the extraocular muscles because they are located outside of the eye. There are four rectus muscles, one attached to each side and one to the top and bottom of the eyeball, about a half centimeter from the cornea. Depending on their location, these act to rotate the eyeball upward, downward, right, and left. Each eye also has a pair of oblique muscles which are attached to the eyeball behind the outside rectus muscles (i.e. behind the right rectus in the case of the right eye and behind the left rectus in the case of the left eye). When the oblique muscles pull against one another, they act to rotate the eye like the steering wheel of a car. The visual axis of each eye is an imaginary line extending from a viewed object to the retina and passing through the air, corrective lens (if any), cornea, aqueous fluid, pupil, crystalline lens, and vitreous fluid.

The binocular image field obtains from an intersection of the right and left conical spaces emanating from each eye. As shown in FIG. 1, when both eyes are aimed directly forward, the coincident centers of the visual space for each eye comprise a simplified binocular field 2. The total horizontal and vertical fields are greater than the binocular field as shown in the shaded area 4. Occlusion of part of the visual field is caused by facial features such as the nose, eyebrows, and cheeks.

Both eyes are nearly in constant motion, thereby enlarging the field of view and eliminating any gaps. The eyes cannot be independently moved but are synchronously deflected in what is known as "saccadic" movement. When two eyes fixate an object, they are brought to simultaneous focus with the separate visual axes directed through the same point in a process called "convergence". The average time to change convergence is about 165 msec. The nearest point of convergence is on the order of 75 mm from the eyes, with anything object closer being viewed as a double image.

To appreciate the full value of depth perception, very precise and intricate alignment of the eyes is necessary. Horizontally, the alignment must be within a few degrees; vertically, even less. If the six muscles controlling each eye cannot point the visual axis of each eye at the same spot within this range, the stereoscopic effect will be diminished or lost. The images may, in fact, be so diverse that the brain cannot fuse them into one image and the person sees two images, a condition called diplopia.

In adults, eyes can become uncoordinated and diplopia can result after muscle-weakening diseases, including myasthenia gravis, multiple sclerosis, stroke. Additionally, diplopia an result from a brain disorder such as a brain tumor, from a cataract, or from mucus caused by an infection. Occasionally, an interval of double vision is experienced by some patients following eye or brain surgery.

If both eyes see well and require little lens correction, a person with a disease-weakened eye muscle may see two images of the world for the rest of his or her life. If an unaffected eye also happens to see better than a weakened-muscle eye, the better eye may be relied on more and more and become so dominant that the weakened eye actually starts deteriorating as a result of the inhibition imposed on it by the brain.

Visual aids utilizing prisms are known. Currently, persons suffering from strabismus, a condition in which each eye points in a different direction, are prescribed glasses utilizing prismatic lenses in which the base is directed upward, downward, outward, or inward. These prisms are intended to strengthen the affected muscles of the deviating eye and thereby cause the eye to straighten over time. The unit of prismatic deviation of the prismatic lenses used in such glasses is the prism diopter. A one diopter prism is one which deflects a beam of light a distance of one centimeter on a plane placed normal to the initial direction of the beam and one meter away from the prism.

Prismatic glasses can be very effective in strengthening the eye muscles of otherwise healthy patients and can thus be employed to straighten the eyes of individuals, particularly young children, suffering from conditions such as strabismus and amblyopia. However, as indicated above, diplopia is often associated with degenerative diseases in which affected muscles grow progressively weaker and the deviation gets larger. In such cases, the prismatic visual aids described above are ineffective.

Accordingly, it is an object of the present invention to provide an adjustable prismatic lens system for a visual aid apparatus which enables a patient suffering from diplopia to retain and maintain binocular vision despite progressive changes in the muscular coordination of the eyes.

SUMMARY OF THE INVENTION

An apparatus for enabling a user having a visual handicap indicative of a condition designated as double vision to obtain substantially binocular vision comprises a first prism associated with the left eye of the user and having a base and a first prismatic deviation, a second prism associated with the right eye of the user and having a base and a second prismatic deviation which is different from the first prismatic deviation, and means for mounting the first and second prisms relative to one another in a selected orientation which enables the user to view through the prisms a binocular image field.

The visual aid apparatus includes means for rotating the first prism about an axis intersecting its base, wherein the prismatic deviations are selected so that the first prism may be rotated to obtain the selected orientation of prisms. Preferably, the visual aid apparatus further includes means for rotating the second prism about an axis intersecting its base, wherein the selected orientation of prisms is obtained by rotating both prisms.

Each prism rotating means preferably comprises a tubular member defining a central bore for receiving a corresponding prism, wherein the longitudinal axis of the tubular member is substantially perpendicular to the base of the prism. Each prism rotating means also comprises a collet member coupled to the mounting means for rotatably receiving the tubular member. The mounting means preferably comprises a first and second carrier lens adapted to receive a corresponding collet member and thereby retain the prism rotating means. First and second corrective lenses may be aligned with the first and second prisms, respectively to provide visual correction, if desired.

A method for providing a binocular vision field to a person suffering from diplopia comprises the steps of providing a first prism associated with the left eye of the person and having a base and a first prismatic deviation, providing a second prism associated with the left eye of the person and having a base and a second prismatic deviation different from the first prismatic deviation, and selecting an orientation of the bases of the prisms relative to one another which enables the user to view a binocular vision field through the prisms.

Preferably, the orientation of the prisms is selected by rotating at least one of the prisms about an axis intersecting the base thereof until a binocular vision field is obtained. The method of providing binocular vision also comprises positioning the prisms in a corresponding carrier lens and aligning a respective corrective lens with a corresponding prism.

DETAILED DESCRIPTION OF THE INVENTION

Figure 1:
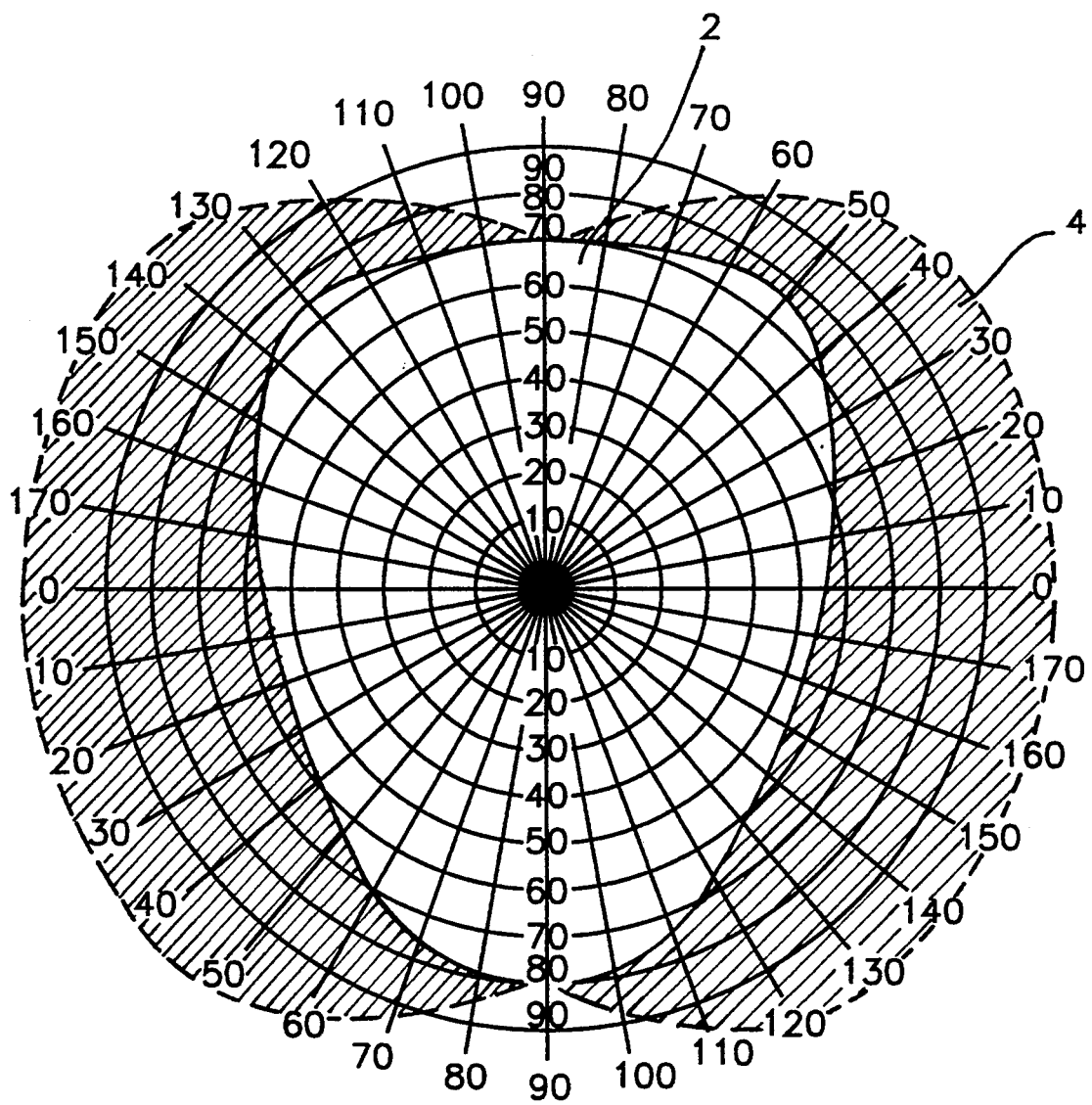
FIG. 1 is a graphical representation of a binocular visual field, the principal object of the present invention.
Figure 2:
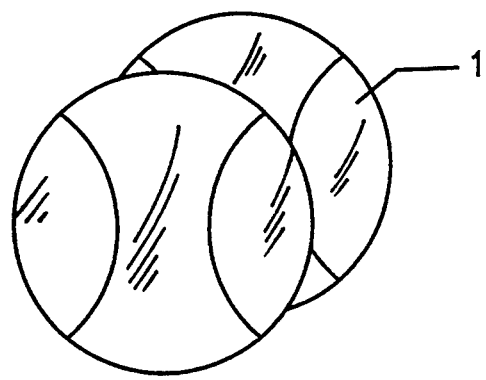
FIG. 2 is a representation of a double image of an object as seen by one suffering from diplopia.
Figure 3:
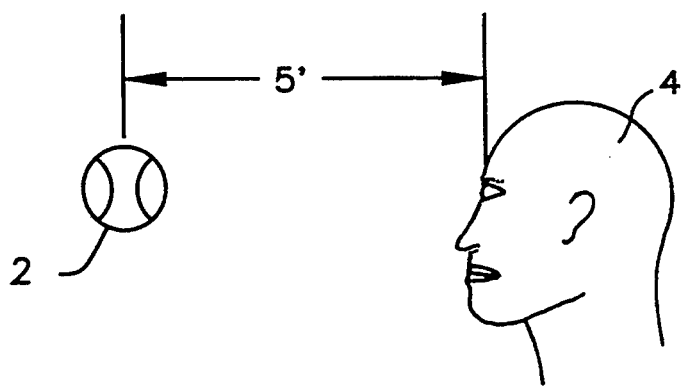
FIG. 3 is a representation of a diplopia sufferer viewing the object which results in the image shown in FIG. 2.
Figures 4A, 4B:
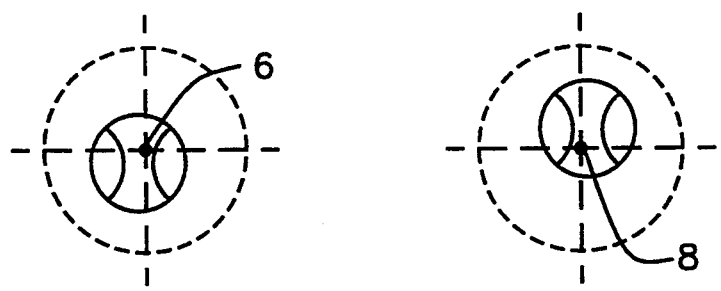
FIGS. 4A and 4B represent the image of the object as seen by the right and left eyes respectively.

In FIG. 2, there can be seen the image 1 of an object (i.e. a tennis ball) as it is viewed by a person who is suffering from diplopia. As discussed above, diplopia occurs when the images seen by the right and left eyes are so diverse that the brain cannot fuse them into one image, so that the person actually sees two images of that object. With reference now to FIG. 3, there is shown a person 4 suffering from diplopia who is viewing the object 2 at a distance of 5 feet. As seen in FIG. 4A, the image of the object 2 seen by the left eye is offset to the left and slightly below the optical axis 6 of the left eye. Similarly, as shown in FIG. 4B, the image of the object viewed by the right eye is offset to the right and slightly above the optical axis 8 of the right eye. This divergence results in the person 4 seeing the double image shown in FIG. 2.

Figure 5:
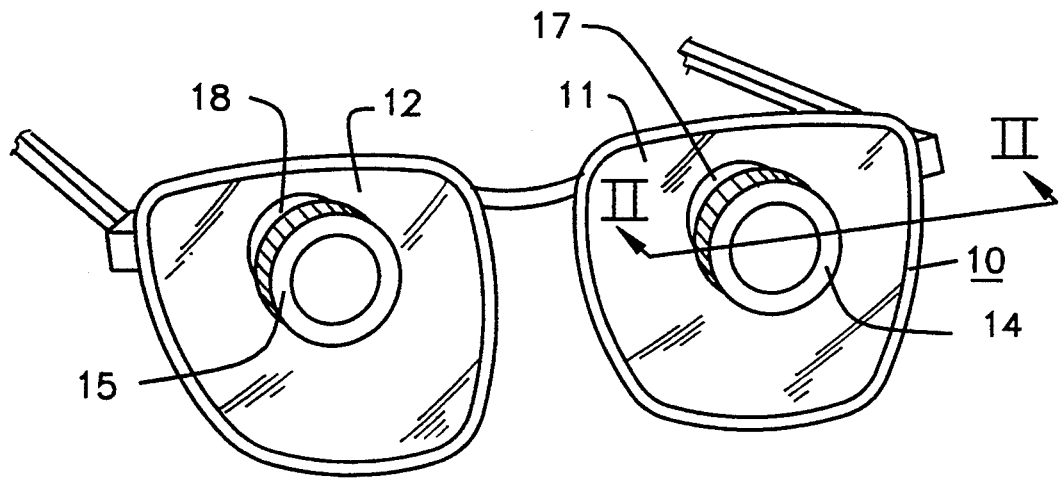
FIG. 5 is a perspective plan view of an adjustable prism assembly associated with a spectacle frame.

With reference now to FIG. 5, there is shown a spectacle frame 10. The spectacle frame 10 has two carrier lenses 11 and 12 indicative of a lens for the right eye and one for the left eye. Each carrier lens 11 and 12 may be a prescription type lens which accommodates the far distance or near distance prescription of the patient who wears the spectacle frame. Located in each carrier lens and positioned within apertures drilled therethrough are respective prism assemblies 14 and 15. Visual aids utilizing apertured carrier lenses to position lens assemblies in alignment with each eye are known. See for example, U.S. Pat. No. 5,129,717 entitled ADJUSTABLE TELESCOPIC ALIGNMENT APPARATUS FOR USE WITH A CARRIER LENS issued to Richard E. Feinbloom on Jul. 14, 1992 and assigned to the assignee herein.

As will be explained later, each prism assembly includes a prism having a respective prismatic deviation selected to provide binocular vision for a particular user when rotated. It will of course be understood that any means for mounting and rotating the respective prism assemblies may be used. In the illustrated embodiment, the prism assemblies are received within corresponding collet members 17 and 18. The collet members, with associated captive and slip rings as will be explained, enable the prism assemblies to rotate and hence to be adjusted.

Figure 6:
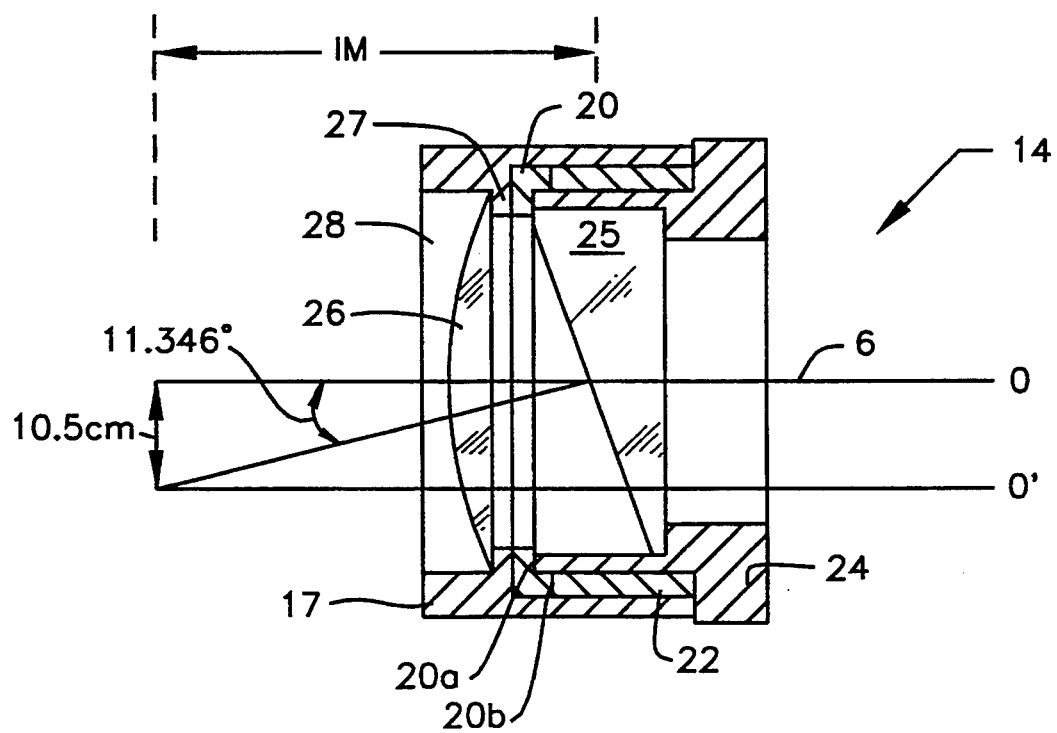
FIG. 6 is a partial cross sectional view of the adjustable prism assembly of FIG. 1 taken across line II—II.

With reference now to FIG. 6, there is shown a cross sectional view of prism assembly 14, it being understood that with the exception of the prismatic deviation of the prism mounted therein, prism assembly 15 is constructed in an identical manner. In the illustrated embodiment, the prism assembly 14 is mounted within fixed housing or collet member 17, and includes a captive ring member 20, a slip ring 22, and a rotating housing 24.

As seen in FIG. 6, collet member 17 defines a central bore having a shoulder ring portion 27 which provides an abutment against which captive ring member 20 is concentrically seated. It is contemplated that the rotatable prism assemblies constructed in accordance with the present invention may be fabricated either in the laboratory or on site by the prescribing eye practitioner. This flexibility is permitted due to the manner in which the slip ring 22 and rotating housing 24 are retained within the collet member 17. With continuing reference to FIG. 6, it can be seen that the rotating housing is retained within the collet member by a captive ring member 20. Captive ring member 20 defines a first or recessed surface 20a and a second or outer abutment surface 20b which are concentrically arranged in parallel planes. As shown in FIG. 6, a slip ring 22 is of substantially the same thickness as outer surface 20b and is inserted within the larger diameter bore of the collet member so as to be in concentric alignment and abutting relation therewith. For a purpose which will soon be described, the exterior surface of slip ring 22 is fastened to the interior surface of collet member 17. It will, of course, be understood that the fastening of slip ring 22 may be accomplished utilizing any suitable means such as by mechanical fasteners, cooperating male and female threads on the respective surfaces of the slip ring and collet members, or a suitable adhesive bonding agent.

It should now be apparent that the captive ring member 20 is freely rotatable within the collet member but prevented from sliding out of the collet bore by shoulder portion 27 and by the proximal end of slip ring 22. Utilizing a suitable adhesive bonding agent, recessed surface 20a of the captive ring member 20 may then be fastened to the proximal edge surface of rotating housing 24 for rotational movement therewith. It will thus be readily appreciated that the rotatable housing 24, which contains prism 25, may be rotated within the collet member but is prevented from sliding out of the bore.

If desired, a prescription type lens 26 which accommodates the far distance or near distance prescription of the patent who wears the spectacle frame can be placed within a bore 28 defined in the collet member at one end thereof.

With continuing reference to FIG. 6, it can be seen that for illustrative purposes, the prism 25 of rotatable prism assembly 14 has a prismatic deviation of 10.5 diopters. Accordingly, when prism 25 is rotated into the position shown, the image O' of an object O will be perceived to be to the right of the optical axis 6. Continued rotation of prism 25 will cause the image O' to rotate about the visual axis and along a circular path having a radius of 10.5 cm.

Figure 7:
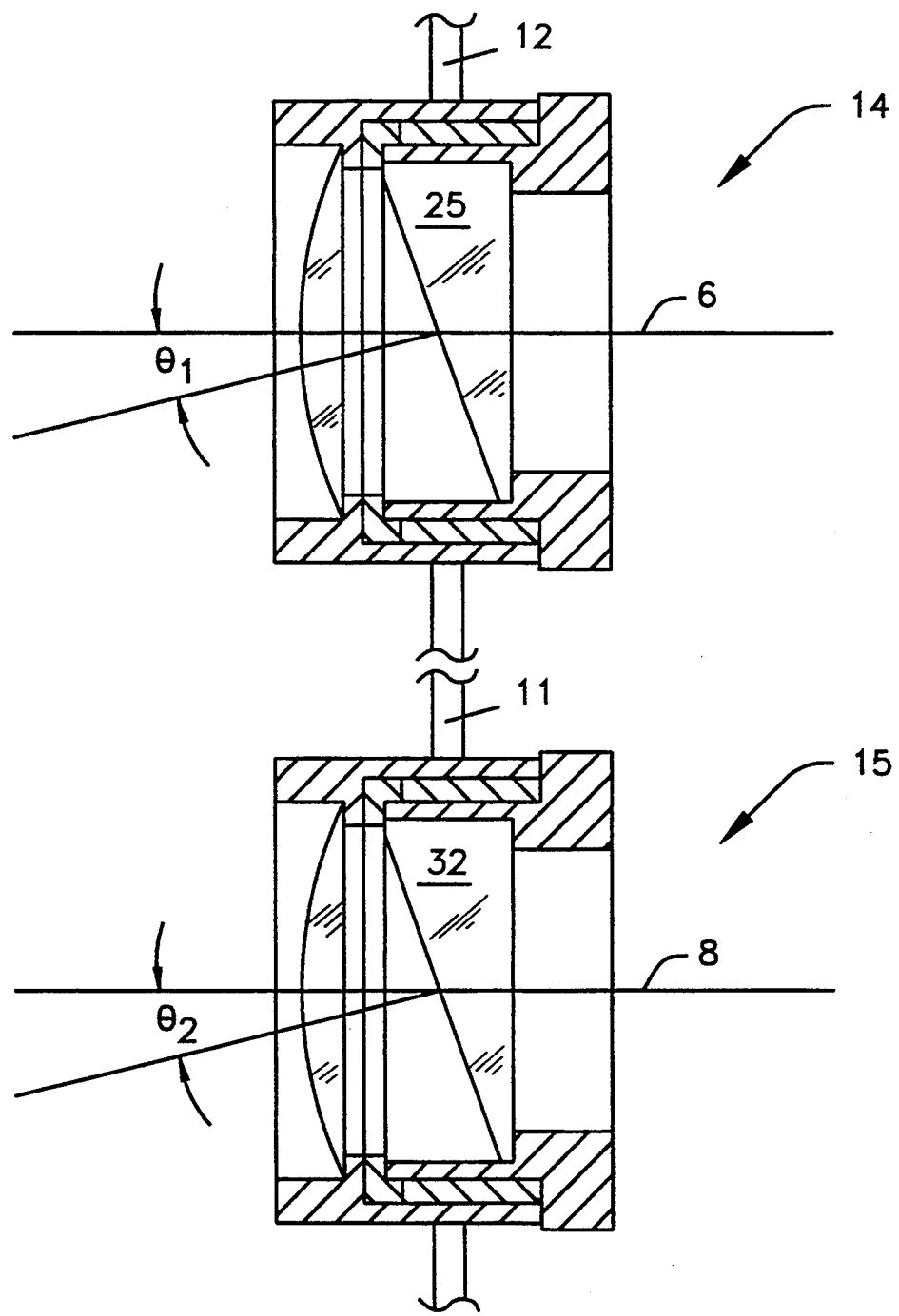
FIG. 7 is a partial cross sectional view of the adjustable prism assembly showing the difference in prismatic deviation between the two prisms.
Figure 8:
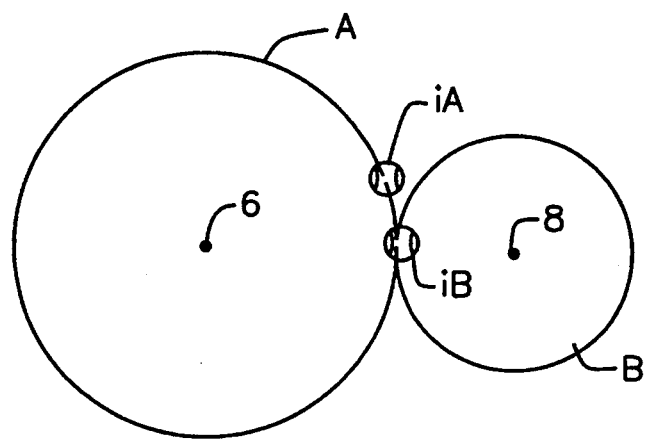
FIG. 8 is a graphical representation showing the circular image paths produced by the rotation of the respective prism assemblies in accordance with the present invention.

As shown in FIG. 7, it can be seen that the prism 25 of the first prism assembly 14 and prism 32 of the second prism assembly 15 have different prismatic deviations, measured by angles $\theta_1$ and $\theta_2$. As such, rotation of each prism assembly results in the respective image paths A and B shown in FIG. 8. If one not suffering from diplopia were to look through the prism assemblies, a binocular vision field would be obtained when the base of each prism is aligned in the same orientation at 0 or 180 degrees. This is due to the ability of the brain to fuse images in the horizontal plane. It has also been found that if the prism assemblies are rotated from the aforementioned orientations, the brain of one not suffering from diplopia will continue to fuse the images into a single image until the assemblies have been rotated beyond a certain point.

Figure 9:
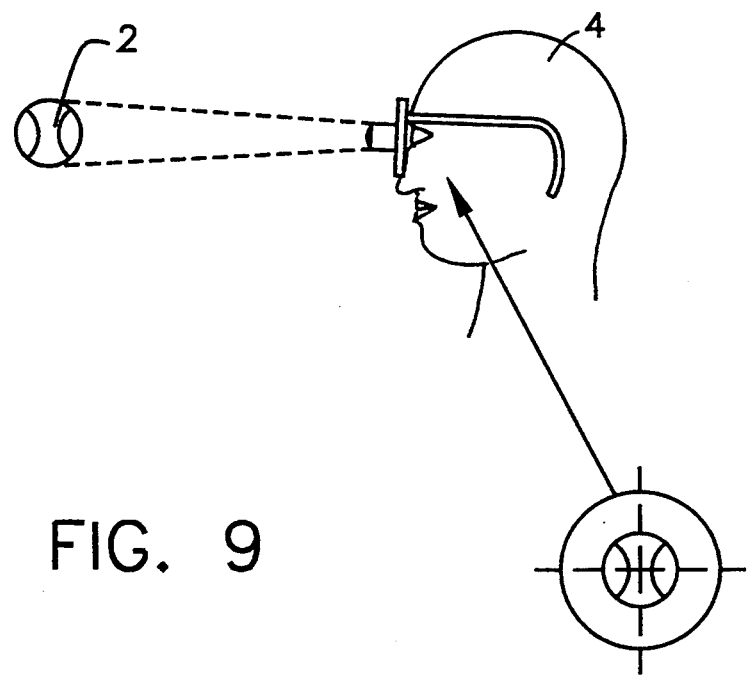
FIG. 9 is an illustration of the object as observed by a diplopia sufferer wearing a properly adjusted visual aid constructed in accordance with the present invention.

For a person suffering from diplopia, one or both of the assemblies may have to be rotated from the aforementioned locations until the brain of the user is able to fuse the images viewed by each eye into a single image, thereby providing a binocular image field. For the exemplary person illustrated in FIG. 3 receiving the images shown in FIGS. 4A and 4B, rotation of the prism assemblies to the positions $i_A$, and $i_B$ shown in FIG. 8 will enable that person to view a single, binocular image, as shown in FIG. 9.

Although the process by which the brain fuses images is a highly complex one, it will be observed that properly oriented prisms of different diopters may be arranged in such a manner that the divergence of received images is reduced to a point sufficient for the brain of the diplopia sufferer to fuse them and create a single, binocular image. It may even be possible to select a combination of prisms which physically superimposes the images, so that the need for the brain to perform any fusion is largely eliminated. Because the degree of needed correction varies from patient to patient, the specific amount of prismatic deviation required for each eye should first be determined by the eye practitioner utilizing appropriate measurement techniques prior to fabrication of the apparatus. Once determined, the appropriate prism assemblies may be inserted into a test frame to verify that the user experiences single, binocular vision.

Although the present invention has been described with reference to particular embodiments, workers skilled in the art will recognize that changes may be made in form and detail without departing from the spirit and scope of the invention.

What is claimed is:

1. Apparatus for enabling a user having a visual handicap indicative of a condition designated as double vision to obtain substantially binocular vision, comprising:
   a first prism associated with a right eye of said user and having a first prismatic deviation;
   a second prism associated with a left eye of said user and having a second prismatic deviation different from said first prismatic deviation; and
   means for positioning said first and second prisms independent of each other in alignment with the eyes of the user and in a stationary orientation relative to one another selected to enable said user to view through said prisms a binocular image of an object.

2. Apparatus according to claim 1, further including means for rotating at least one prism.

3. Apparatus according to claim 2, wherein the prismatic deviations are selected so that only one of said prisms need be rotated to obtain said selected orientation.

4. Apparatus according to claim 2, further including means for rotating both of said prisms.

5. Apparatus according to claim 4, wherein said prismatic deviations are selected so that both of said prisms may be rotated to obtain said stationary orientation.

6. Apparatus according to claim 4, wherein said means for rotating the prisms comprises first and second tubular members each defining a central bore for receiving said first and second prisms respectively and wherein the longitudinal axis of each tubular member is substantially perpendicular to a corresponding prism base surface.

7. Apparatus according to claim 6, wherein said means for rotating the prisms further comprises first and second collet members coupled to the positioning means for rotatably receiving a corresponding tubular member.

8. Apparatus according to claim 1, wherein said positioning means comprises a first carrier lens for retaining said first prism, a second carrier lens for retaining said second prism, and a frame means for receiving and retaining said carrier lenses, and wherein a substantial portion of each of said carrier lenses surrounding said prisms are exposed when said prisms are retained thereon.

9. Apparatus according to claim 1, further including first and second corrective lenses aligned with said first and second prisms, respectively.

10. Apparatus for enabling a user having a visual handicap indicative of a condition designated as double vision to obtain substantially binocular vision, comprising:
   a first carrier lens:
   a first prism retained on a portion of said first carrier lens, said first prism being aligned with the left eye of said user having a first prismatic deviation;
   a second carrier lens;
   a second prism retained on a portion of said second carrier lens, said second prism being aligned with the right eye of said user and having a second prismatic deviation;
   frame means for receiving and retaining said carrier lenses: and
   means for orienting said first and second prisms independent of each other and relative to one another in a selected stationary orientation which enables said user to view through said prisms a binocular image field.

11. Apparatus according to claim 10, wherein said orienting means comprises means manipulable to rotate said first prism about an optical axis extending therethrough, whereby said selected orientation may be obtained by rotating said first prism into a selected position.

12. Apparatus according to claim 11, wherein said orienting means further comprises means manipulable to rotate said second prism about an optical axis extending therethrough, whereby said selected orientation may be obtained by rotating said first and second prisms into selected positions.

13. The apparatus according to claim 10 wherein each of said carrier lenses is a prescription type lens which accommodates the eyesight of the user.

14. The apparatus according to claim 13 wherein each of said first and second prisms are retained within an aperture of respective said first and second carrier lenses.

15. A method for providing binocular vision to a person suffering from double vision comprising the steps of:
   providing a first prism associated with the left eye of said person and having a base and a first prismatic deviation;
   providing a second prism associated with the right eye and having a base and a second prismatic deviation different from said first prismatic deviation; and
   selecting a stationary orientation of the bases of the prisms with respect to one another which enables the person to view a binocular vision field through the prisms.

16. Method according to claim 15, wherein said selecting step comprises rotating one of said prisms to a position relative to the other of said second prism until a binocular image is viewable through said prisms by said person.

17. The method of claim 15, wherein said selecting step comprises rotating the first and second prisms until a binocular image is viewable through said prisms by said person.

18. The method of claim 17, wherein each of said prisms is rotated about a respective axis which is substantially perpendicular to a corresponding prism base surface.

19. The method according to claim 15, further comprising the step of positioning said prisms in a corresponding carrier lens.

20. The method according to claim 15, further comprising the step of aligning a respective corrective lens with a corresponding prism.

* * * * *